United States Patent
Pearson et al.

(10) Patent No.: US 9,842,165 B2
(45) Date of Patent: *Dec. 12, 2017

(54) SYSTEMS AND METHODS FOR GENERATING CONTEXT SPECIFIC TERMS

(71) Applicant: D2L Corporation, Kitchener (CA)

(72) Inventors: Brian Pearson, Waterloo (CA); Jeremy Jason Auger, Breslau (CA)

(73) Assignee: D2L Corporation, Kitchener, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/300,190

(22) Filed: Jun. 9, 2014

(65) Prior Publication Data

US 2014/0289215 A1 Sep. 25, 2014

Related U.S. Application Data

(63) Continuation of application No. 13/271,696, filed on Oct. 12, 2011, now Pat. No. 8,782,058.

(51) Int. Cl.
*G06F 17/30* (2006.01)

(52) U.S. Cl.
CPC .... *G06F 17/30864* (2013.01); *G06F 17/3064* (2013.01); *G06F 17/30598* (2013.01)

(58) Field of Classification Search
CPC ......... G06F 17/30864; G06F 17/30598; G06F 17/3012; G06F 17/3092; G06F 17/2247; G06F 17/30038; G06F 17/3064; G06F 3/0482; G06F 9/45533; G06F 17/30; G06Q 10/1097; G06Q 50/12; G06Q 30/0643; G06Q 10/10; G06Q 30/108; G06Q 50/205; G06Q 30/018; H04L 67/306
USPC ....... 707/749, 737, 736, 750, 767, 758, 780, 707/781, 757, 705, 783, 706, E17.005, 707/E17.017, E17.064, E17.071, E17.084, 707/E17.041, E17.042, E17.126; 715/257, 259, 261, 255, 256, 260; 704/9, 704/10, 251, E15.022, E15.023, E15.024, 704/E15.026, 245; 706/205, 217, 225
See application file for complete search history.

(56) References Cited

U.S. PATENT DOCUMENTS

| | | | |
|---|---|---|---|
| 6,115,709 A * | 9/2000 | Gilmour | G06F 17/3061 705/7.29 |
| 7,856,597 B2 * | 12/2010 | Stuhec | 715/255 |
| 8,364,695 B2 * | 1/2013 | Berkowitz | G06F 17/3064 707/768 |

(Continued)

*Primary Examiner* — Anh Ly
(74) *Attorney, Agent, or Firm* — Bereskin & Parr LLP

(57) ABSTRACT

Various embodiments are described herein that generally relate to systems and methods for generating context specific terms and performing various actions based on the context specific terms. One example embodiment includes a computer-implemented method for generating context specific terms comprising obtaining a collection of terms from at least one electronic file associated with a given context; comparing the collection of terms with a collection of expected terms to generate candidate terms that are not in the collection of expected terms; determining a relevance for each of the candidate terms; and determining whether to add a given candidate term to a collection of context specific terms for the given context if the relevance for the given candidate term is above a threshold.

26 Claims, 6 Drawing Sheets

(56) References Cited

U.S. PATENT DOCUMENTS

| | | | |
|---|---|---|---|
| 8,843,476 B1* | 9/2014 | Zhang | G06F 17/30719 707/723 |
| 8,862,595 B1* | 10/2014 | Lim | G06F 17/30669 707/749 |
| 9,449,080 B1* | 9/2016 | Zhang | G06F 17/30657 707/723 |
| 2002/0103834 A1* | 8/2002 | Thompson et al. | 707/526 |
| 2002/0165851 A1* | 11/2002 | Fernandes | G06F 17/30705 707/E17.058 |
| 2004/0249650 A1* | 12/2004 | Freedman | G06Q 30/02 705/7.29 |
| 2005/0106539 A1* | 5/2005 | Bagley | G06F 17/30616 434/169 |
| 2005/0160082 A1* | 7/2005 | Dawson | 707/3 |
| 2006/0173886 A1* | 8/2006 | Moulinier et al. | 707/101 |
| 2007/0016625 A1* | 1/2007 | Berstis | 707/200 |
| 2007/0073894 A1* | 3/2007 | Erickson et al. | 709/230 |
| 2007/0100779 A1* | 5/2007 | Levy et al. | 705/500 |
| 2007/0118506 A1* | 5/2007 | Kao | G06F 17/30719 707/E17.094 |
| 2007/0118518 A1* | 5/2007 | Wu | G06F 17/30719 707/E17.094 |
| 2008/0140643 A1* | 6/2008 | Ismalon | 707/5 |
| 2008/0256057 A1* | 10/2008 | Riise et al. | 707/5 |
| 2009/0094227 A1* | 4/2009 | Berkowitz | G06F 17/3064 707/E17.014 |
| 2009/0204609 A1* | 8/2009 | Labrou et al. | 707/5 |
| 2009/0226872 A1* | 9/2009 | Gunther | G09B 7/00 434/350 |
| 2009/0254971 A1* | 10/2009 | Herz | G06Q 10/10 726/1 |
| 2009/0292677 A1* | 11/2009 | Kim | G06F 17/3089 707/E17.108 |
| 2009/0299998 A1* | 12/2009 | Kim | G06F 17/30864 707/E17.109 |
| 2011/0167026 A1* | 7/2011 | Baker | G09B 19/18 706/12 |
| 2012/0078918 A1* | 3/2012 | Somasundaran et al. | 707/748 |
| 2012/0117082 A1* | 5/2012 | Koperda et al. | 707/748 |
| 2012/0149000 A1* | 6/2012 | Baker | G09B 7/00 434/362 |

* cited by examiner

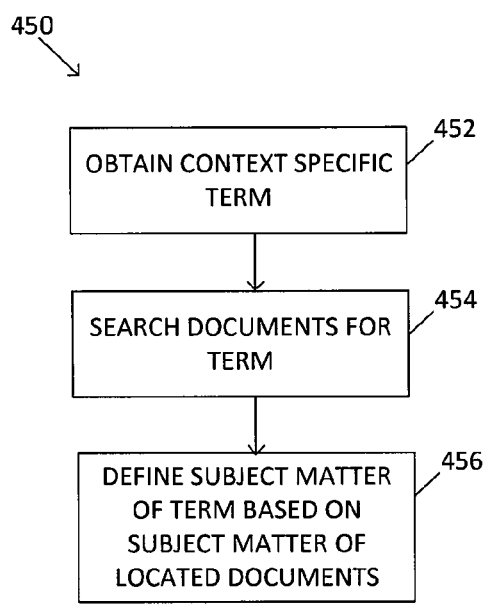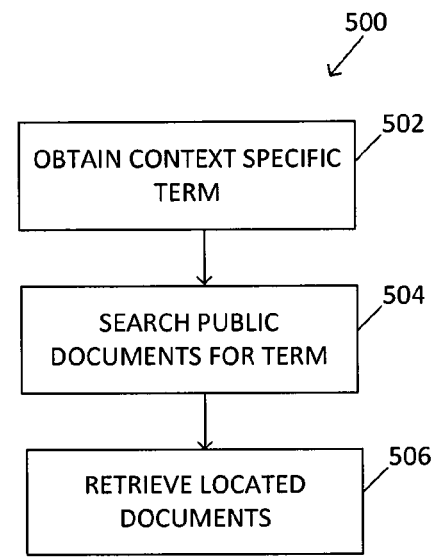
FIGURE 7
FIGURE 8

US 9,842,165 B2

SYSTEMS AND METHODS FOR GENERATING CONTEXT SPECIFIC TERMS

RELATED APPLICATIONS

This application is a continuation of U.S. patent application Ser. No. 13/271,696, filed Oct. 12, 2011, now U.S. Pat. No. 8,782,058; and entitled SEARCH INDEX DICTIONARY, the entire contents of which are hereby incorporated by reference herein for all purposes.

FIELD

Various embodiments are described herein that generally relate to systems and methods for generating context specific terms and performing various actions based on the context specific terms.

INTRODUCTION

In certain cases, there are terms that are used that are not generally part of a certain language, such as the English language for example. These terms can be words, acronyms, phrases, symbols and the like that are new and/or may have a specific meaning when used in a certain context such as in, but not limited to, a certain subject area or educational course, or by a certain individual, group or organization. For example, at one time terms such as "hotfix" and "lor" were new terms that may not have been readily understood to mean "software patches applied to live running systems" and "Learning Object Repository", respectively. When there are terms that are new and used in a certain context that is specific to an individual, a group, an organization or and educational system, then software programs and other individuals may have difficulty interpreting these terms because they have never encountered these terms previously.

SUMMARY

In one aspect, in at least one example embodiment described herein, there is provided a computer-implemented method for generating context specific terms. The method comprises obtaining a collection of terms from at least one electronic file associated with a given context; comparing the collection of terms with a collection of expected terms to generate candidate terms that are not in the collection of expected terms; determining a relevance for each of the candidate terms; and determining whether to add a given candidate term to a collection of context specific terms for the given context if the relevance for the given candidate term is above a threshold.

In at least some cases, the step of determining whether to add the given candidate term to the collection of context specific terms comprises ensuring that the given candidate term is a valid term.

In at least some cases, the step of determining the relevance comprises ranking the candidate terms.

In at least some cases, the step of determining the relevance comprises obtaining a weighted frequency for the candidate terms.

In at least some cases, the candidate terms that are more common are more heavily weighted than the candidate terms that are less common.

In at least some cases, the method further comprises obtaining at least one of the collection of terms and the collection of expected terms from one or more existing repositories having a common characteristic.

In at least some cases, the common characteristic comprises at least one of a common language, a common subject matter and a common organizational group.

In at least some cases, the one or more existing repositories are organized hierarchically according to a hierarchical structure of an organization from which the one or more repositories are obtained.

In at least some cases, the method further comprises using the collection of context specific terms in a spell-check application.

In at least some cases, the method further comprises associating the collection of context specific terms with at least one of an educational course, an organizational group and a user identifier.

In at least some cases, the method further comprises seeding a glossary based upon one or more the context specific terms for the given context.

In at least some cases, the method further comprises providing one or more of the context specific terms to a search engine that searches for one or more electronic files that are related to the one or more context specific terms.

The at least one electronic file may comprise at least one of a webpage, a word processing document, a spreadsheet, a presentation document, a search index of organizational content, database content, discussion forum content, and an email.

In at least some cases, the method further comprises classifying a given context specific term based on an assigned technical level as determined from metadata structure associated with a search of public files.

In at least some cases, the method further comprises classifying a given context specific term based on a subject matter of located files that use the context specific term.

In another aspect, in at least one example embodiment described herein, there is provided a computing device for generating context specific terms. The computing device comprises a data storage device comprising at least one electronic file; and at least one processor in data communication with the data storage device. The at least one processor is adapted to obtain a collection of terms from the at least one electronic file associated with a given context; to compare the collection of terms with a collection of expected terms to generate candidate terms that are not in the collection of expected terms; to determine a relevance for each of the candidate terms; and to determine whether to add a given candidate term to a collection of context specific terms for the given context if the frequency of occurrence for the given candidate term is above a threshold.

In at least some cases, the computing device can also be configured to carry out at least one of the steps of the method described herein.

In yet another aspect, in at least one example embodiment described herein, there is provided a computer readable medium comprising a plurality of instructions executable on a processor of an electronic device for adapting the electronic device to implement a method of generating context specific terms. The method comprises obtaining a collection of terms from at least one electronic file associated with a given context; comparing the collection of terms with a collection of expected terms to generate candidate terms that are not in the collection of expected terms; determining a relevance for each of the candidate terms; and determining whether to add a given candidate term to a collection of context specific terms for the given context if the relevance for the given candidate term is above a threshold.

In at least some cases, the computer readable medium can also have instructions that are executable on a processor of an electronic device for adapting the electronic device to carry out at least one of the steps of the method described herein.

DRAWINGS

For a better understanding of the various embodiments described herein, and to show more clearly how these various embodiments may be carried into effect, reference will be made, by way of example, to the accompanying drawings which show at least one example embodiment, and in which:

FIG. 7 is a flow chart diagram illustrating an example embodiment of a method for determining a subject for a context specific term; and FIG. 8 is a flow chart illustrating an example embodiment of a method for collecting documents based on context specific terms.

DESCRIPTION OF VARIOUS EMBODIMENTS

Figure 1:
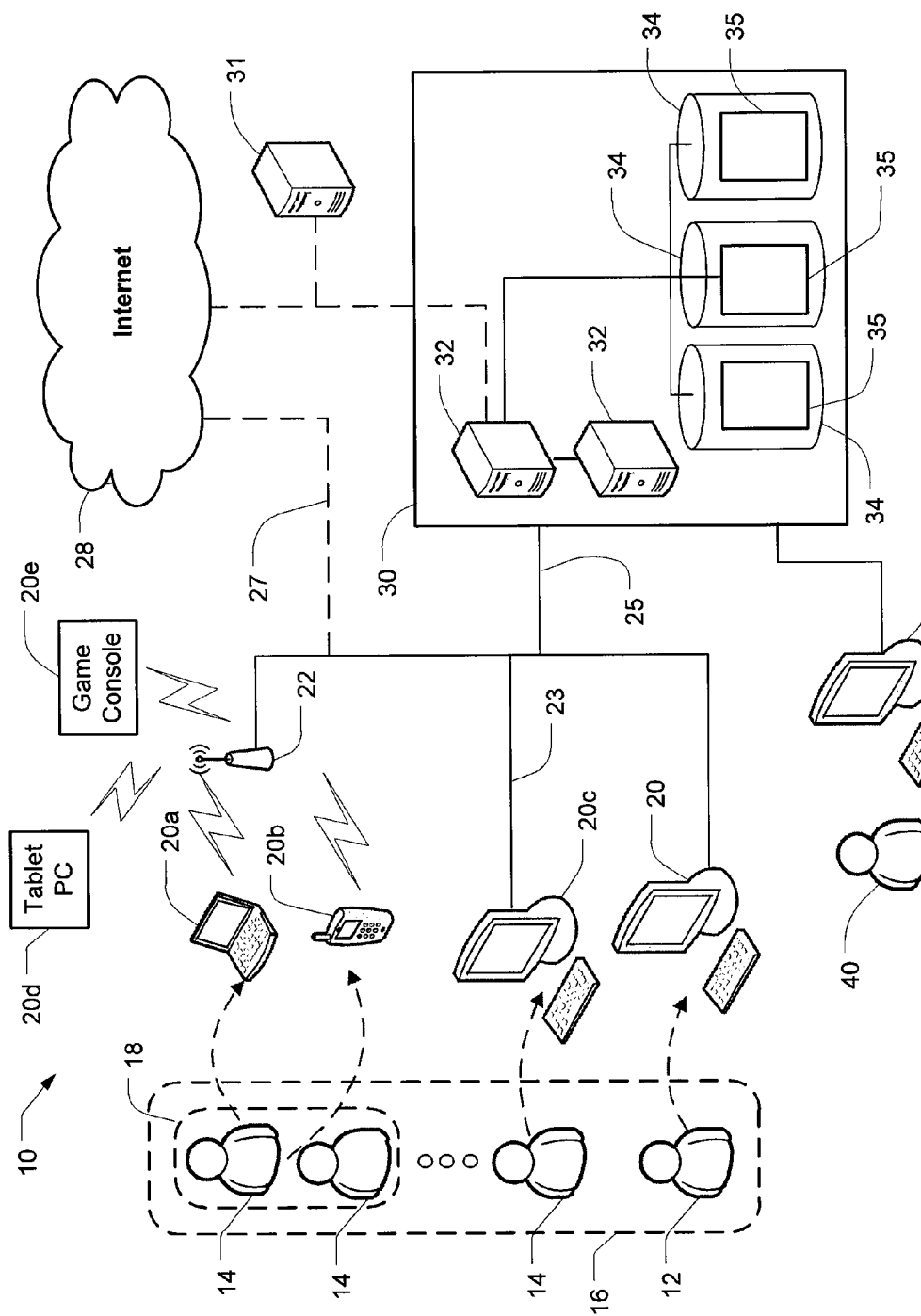
FIG. 1 is a block diagram illustrating an example embodiment of an educational system for providing electronic learning.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein.

The various embodiments of the systems and methods described herein may be implemented in hardware or software, or a combination of both. For example, some embodiments may be implemented in computer systems and computer programs, which may be stored on a physical computer readable medium, executable on programmable computers (e.g. computing devices and/or processing devices) each comprising at least one processor, a data storage system (including volatile and non-volatile memory and/or storage elements), at least one input device (e.g. a keyboard, mouse or touchscreen), and at least one output device (e.g. a display screen, a network, or a remote server). For example, and without limitation, the programmable computers may include servers, personal computers, laptops, tablets, personal data assistants (PDA), cell phones, smart phones, gaming devices, and other mobile devices. Program code can be applied to input data to perform the functions described herein and to generate output information. The output information can then be supplied to one or more output devices for outputting to one or more users.

The embodiments described herein generally relate to systems and methods for generating context specific terms. Various actions may be performed based on the context specific terms. The context specific terms are terms that are not generally part of a certain language, such as the English language for example. However, these terms are valid terms that can be words, acronyms, phrases, symbols and the like that are new and/or may have a specific meaning when used by a certain individual, group or organization or used in an educational course or subject area. In some embodiments, the methods that generate context specific terms may also be extended to sounds. Accordingly, the various embodiments of systems and methods described herein determine which terms are context specific terms and then may provide various functions based on the context specific terms. In some embodiments, the various functions may also be based on the introduction of new context specific terms. While the various embodiments of the system described herein are from the perspective of an electronic educational learning system, it should be understood that the techniques to determine context specific terms and perform certain actions based on existing context specific terms or newly introduced context specific terms can be performed by other electronic systems including those used by corporations, organizations or individuals (e.g. a personal computer or laptop). For example, in alternative embodiments, the context specific techniques described herein may be used as a plug-in for many types of systems, such as word processing tools. As another example, an "insert glossary" function can be defined based on the methods to generate context-specific terms described herein such that the function generates a content page with a formatted glossary in which the definitions are either to be filled in at a later time or sourced from definitions found in public or private documents and not found in a standard $3^{rd}$ party, built-in dictionary (this glossary application is described in further detail below).

Referring now to FIG. 1, shown therein an example embodiment of an educational system 10 for providing electronic learning. One or more users 12 and 14 can use the educational system 10 to communicate with an educational service provider 30 to participate in, create, and consume electronic learning services, including various educational courses. In some cases, the educational service provider 30 may be part of or associated with a traditional "bricks and mortar" educational institution (e.g. an elementary school, a high school, a university or a college), another entity that provides educational services (e.g. an online university, a company that specializes in offering training courses, or an organization that has a training department), or may be an independent service provider (e.g. for providing individual electronic learning). Therefore, it should be understood that a course is not limited to formal courses offered by formal educational institutions. The course may include any form of learning instruction offered by an entity of any type. For example, the course may be a training seminar at a company for a small group of employees or a professional certification program with a larger number of intended participants (e.g. PMP, CMA, etc.).

In some embodiments, one or more educational groups can be defined that involve one or more of the users 12 and 14. For example, as shown in FIG. 1, the users 12 and 14 may be grouped together in an educational group 16 representative of a particular course (e.g. History 101, French 254), in which the user 12 is an "instructor" and is responsible for providing the course (e.g. organizing lectures, preparing assignments, creating educational content, etc.), while the other users 14 are "learners" that consume the course content, e.g. the users 14 are enrolled in the course to learn the course content.

In some cases, the users 12 and 14 may be associated with more than one educational group. For instance, the users 14 may be enrolled in more than one course and the user 12 may be enrolled in at least one course and may be responsible for teaching at least one other course or the user 12 may be responsible for teaching more than one course.

In some cases, educational sub-groups may also be formed. For example, two of the users 14 are shown as part of an educational sub-group 18. The sub-group 18 may be formed in relation to a particular project or assignment (e.g. sub-group 18 may be a lab group) or based on other criteria. In some cases, due to the nature of the electronic learning, the users 14 in a particular sub-group 18 need not physically meet, but may collaborate together using various tools provided by the educational service provider 30.

In some cases, the groups 16 and sub-groups 18 could include users 12 and 14 that share common interests (e.g. interests in a particular sport), that participate in common activities (e.g. users that are members of a choir or a club), and/or have similar attributes (e.g. users that are male, users under twenty-one years of age, etc.).

Communication between the users 12 and 14 and the educational service provider 30 can occur either directly or indirectly using any suitable computing device. For example, the user 12 may use a computing device 20 such as a desktop computer that has at least one input device (e.g. a keyboard and a mouse) and at least one output device (e.g. a display screen and speakers).

The computing device 20 can generally be any suitable device for facilitating communication between the users 12 and 14 and the educational service provider 30. For example, the computing device 20 could be a laptop 20a wirelessly coupled to an access point 22 (e.g. a wireless router, a cellular communications tower, etc.), a wirelessly enabled personal data assistant (PDA) 20b or smart phone, a terminal 20c over a wired connection 23 or a tablet computer 20d or a game console 20e over a wireless connection.

The computing devices 20 may be connected to the service provider 30 via any suitable communications channel. For example, the computing devices 20 may communicate to the educational service provider 30 over a local area network (LAN) or intranet, or using an external network, such as, for example, by using a browser on the computing device 20 to browse one or more web pages presented over the Internet 28 over a data connection 27.

The wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one user 14 may use a laptop 20a to browse to a webpage that displays elements of an electronic learning system (e.g. a course page).

In some cases, one or more of the users 12 and 14 may be required to authenticate their identities in order to communicate with the educational service provider 30. For example, the users 12 and 14 may be required to input a login name and/or a password or otherwise identify themselves to gain access to the educational system 10.

In other cases, one or more users (e.g. "guest" users) may be able to access the educational system 10 without authentication. Such guest users may be provided with limited access, such as the ability to review only one or a few components of the course, for example, to decide whether they would like to participate in the course.

The educational service provider 30 generally includes a number of functional components for facilitating the provision of social electronic learning services. For example, the educational service provider 30 generally includes one or more processing devices 32 (e.g. servers), each having one or more processors. The processing devices 32 are configured to send information (e.g. HTML or other data) to be displayed on one or more computing devices 20, 20a, 20b and/or 20c in association with social electronic learning (e.g. course information). In some cases, the processing device 32 may be a computing device 20 (e.g. a laptop or a personal computer).

The educational service provider 30 also generally includes one or more data storage devices 34 (e.g. memory, etc.) that are in communication with the processing devices 32, and could include a relational database (such as an SQL database), or other suitable data storage devices. The data storage devices 34 are configured to host data 35 about the courses offered by the service provider. For example, the data 35 can include course frameworks, educational materials to be consumed by the users 14, records of assessments of users 14, assignments done by the users 14, as well as various other databases and the like.

The data storage devices 34 may also store authorization criteria that define which actions may be taken by the users 12 and 14. In some cases, the authorization criteria may include at least one security profile associated with at least one role. For example, one role could be defined for users who are primarily responsible for developing an educational course, teaching it, and assessing work product from students of the course. Users with such a role may have a security profile that allows them to configure various components of the course, to post assignments, to add assessments, to evaluate performance, and so on.

In some cases, some of the authorization criteria may be defined by specific users 40 who may or may not be part of the educational community 16. For example, users 40 may be permitted to administer and/or define global configuration profiles for the educational system 10, define roles within the educational system 10, set security profiles associated with the roles, and assign roles to particular users 12 and 14 who use the educational system 10. In some cases, the users 40 may use another computing device (e.g. a desktop computer 42) to accomplish these tasks.

The data storage devices 34 may also be configured to store other information, such as personal information about the users 12 and 14 of the educational system 10, information about which courses the users 14 are enrolled in, roles to which the users 12 and 14 are assigned, particular interests of the users 12 and 14 and the like.

The processing devices 32 and data storage devices 34 may also provide other electronic learning management tools (e.g. allowing users to add and drop courses, communicate with other users using chat software, etc.), and/or may be in communication with one or more other vendors that provide the tools. The processing devices 32 can also be configured to generate context specific terms and perform various functions related to the context specific terms and the data 35 can include collections of expected terms as well as context specific terms, as will be described in more detail with regards to FIGS. 2 to 8.

In some cases, the educational system 10 may also have one or more backup servers 31 that may duplicate some or all of the data 35 stored on the data storage devices 34. The backup servers 31 may be desirable for disaster recovery to prevent undesired data loss in the event of an electrical outage, fire, flood or theft, for example.

In some cases, the backup servers 31 may be directly connected to the educational service provider 30 but located within the educational system 10 at a different physical location. For example, the backup servers 31 could be located at a remote storage location that is some distance away from the service provider 30, and the service provider 30 could connect to the backup server 31 using a secure communications protocol to ensure that the confidentiality of the data 35 is maintained.

Figure 2:
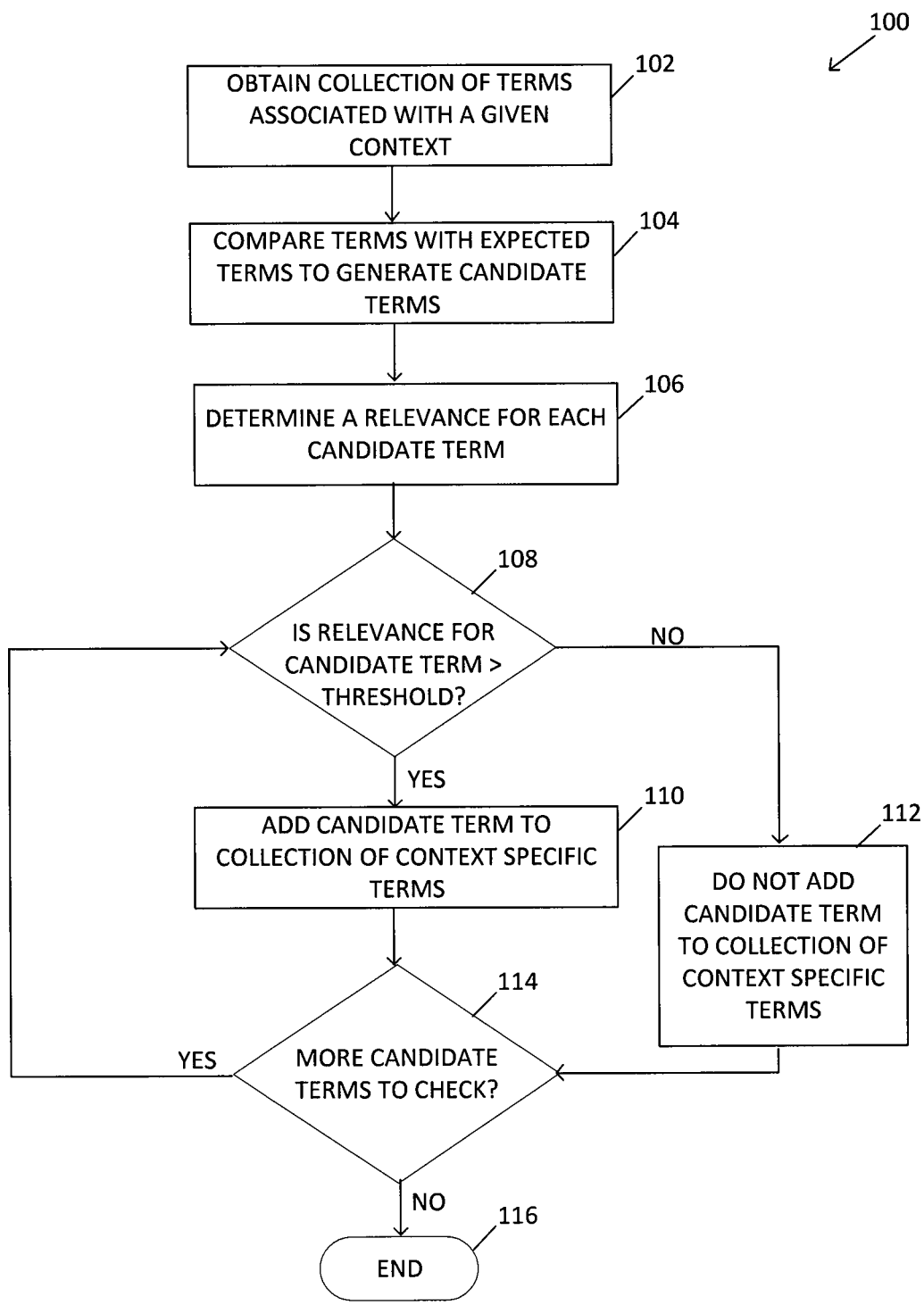
FIG. 2 is a flow chart diagram illustrating an example embodiment of a method for generating context specific terms.

Referring now to FIG. 2, shown therein is a flow chart diagram illustrating an example embodiment of a method 100 for generating context specific terms. The method 100, as well as the other methods that are described herein, are computer-implemented methods that improve the efficiency with which a user can work with and use context specific terms. At step 102, a collection of terms is obtained from at least one electronic file associated with a given context. The collection of terms can include words, terms, short phrases, acronyms, slang and the like. The context can be that the electronic files are obtained from a repository or data store having a common characteristic such as, but not limited to, files associated with an educational course (e.g. computer courses) or with an organizational group such as the engineering department of a company or the medical department of a university, for example. The context may be a layered context in the sense that the files may be related to one another in a hierarchical manner. For example, the electronic files can be associated with an educational course such as "Introductory Electronics", which is a subset of the Electrical Engineering Department which is a subset of the Faculty of Applied Science and Engineering which is the subset of a university or college. The electronic files can include, but are not limited to, word processing documents, spreadsheets, presentation documents (e.g. Power point files), web pages, PDF documents, a search index of the organization's content, database content, as well as user generated content from various sources such as discussion forums, emails, and reports. Other documents can also be used to obtain the collection of terms such as content indexed from an external third-party system.

In alternative embodiments, a user or administrator may be able to define where the electronic files can be obtained, which effectively allows the user or the administrator to define the scope of the context specific words that are generated. For example, if the user is an instructor, the instructor can set the scope of the context specific terms to be based on the courses that the teacher teaches, the terms used within a specific course or the terms used within a certain department. In some embodiments, there can also be an authorization function that determines whether a certain user is authorized to set the scope of the context specific terms or to submit (e.g. accept) a word for entry into the collection of context specific terms.

At step 104, the collection of terms is compared with a collection of expected terms to generate candidate terms that are not in the collection of expected terms. The collection of expected terms is obtained or augmented based on at least one file from one or more existing repositories that have a common characteristic. For example, these terms can be obtained by performing a scan of the files in these repositories or from accessing an index of terms that has already been made and is associated with files in these repositories. The collection of terms from step 102 can also be obtained from one or more repositories having a common characteristic as is described herein for the generation of the collection of expected terms. The common characteristic can be that the repositories contain files that are all in a common language (e.g. English) or have a common subject matter (e.g. electrical engineering). For example, the collection of expected terms can be obtained from one or more of an English dictionary, an engineering dictionary, and a medical dictionary. In some cases, the common characteristic can be that the repositories contain files that come from a common organizational group (e.g. an educational course, an educational department, an educational organization, a company department, an industry association, etc.). In this case, the collection of expected terms may be obtained from a term list, glossary or term index generated from content associated with the common organizational group. The common organizational group may also include files related to a single user, files related to a single project, or files related to a single user working on a single project from which the collection of expected terms can be obtained. In general, these repositories can be organized hierarchically according to a hierarchical structure of an organization from which the repositories are obtained. For example, a repository can be related to a computer programming class, which is contained within a repository associated with a computer engineering department, which is contained within a repository associated with the electrical and computer engineering department of a university.

Each context can have a set of expected terms and context specific terms. The contexts can be arranged in a hierarchy, so it follows that the expected terms and context specific terms naturally form a hierarchy because of their association with the contexts. The context also depends on what is used to generate the set of expected terms. For example, medical terms may be identified as a collection of candidate context-specific terms when compared to standard terms obtained from an English dictionary. The context of the candidate terms may be determined programmatically by seeing if these terms match a particular context-specific index. For example, if many candidate terms match with standard terms from a known medical dictionary, then the context of the candidate terms can be determined to be medical. Therefore, one example embodiment can involve comparing terms to an English dictionary (or other standard language dictionary) to generate candidate terms for an unknown context. A context can then be determined by comparing this list of candidate terms to other term lists with known contexts by seeing if there is a high degree of matching thereby indicating a given context, such as "medical" for example. If the candidate terms are all unrelated (e.g. one term is a medical term, one term is a computer-programming term, one term is a Russian word, etc.), it may be determined that the list of candidate terms is from a context that is specific to a particular organizational group, user or other entity versus a particular subject matter area.

At step 106, a relevance is determined for each of the candidate terms. The relevance can be determined or computed in a number of ways. The relevance can be obtained by ranking the candidate terms based on the number of times they appear in the collection of terms and then listing the candidate terms from most prevalent to least prevalent. Alternatively, computing the relevance may comprise obtaining a weighted frequency for each of the candidate terms. In another alternative embodiment, in some cases it may be beneficial to weight the candidate terms such that the terms that are rare are more heavily weighted than the candidate terms that are more common. In another alternative embodiment, the candidate terms can be weighted such that the terms that are more common are more heavily weighted than the candidate terms that are less common. In another alternative embodiment, the relevance of a particular candidate term can be weighted lower if it is on a list of frequently misspelled words or a list of common typographical errors (e.g. "teh"). In another alternative embodiment, the relevance of a particular candidate term can be weighted based on the length of the term (for example, longer or shorter terms may be more relevant in certain cases). In another alternative embodiment, two or more of these weighting techniques can be combined where possible. For example, a base weight can be determined based on the frequency of a particular term in the collection of candidate terms and this base weight can then be adjusted if the term has a certain length. In some cases, it may also be possible to take the term frequency taken from a sampling of external content (such as from the Internet for example). In addition, in some cases, it may be possible to provide a prepopulated list of candidate terms that could be generated based on an analysis of certain Internet websites or another large sample of documents.

At step 108, a decision is made on whether to add a given candidate term to the collection of context specific terms based on some decision metric. For example, the given candidate term can be added to the collection of context specific terms for a given context if the relevance for the given candidate term is above a threshold value. The determination of the threshold value can be done in many different ways and can be related to how the relevance is computed. For example, a percentage can be used for the threshold in which case the candidate term would need to account for at least a given percentage (for example, but not limited to, 0.0005 percent) of all of the candidate terms or for all of the terms related to the content.

If the decision at step 108 is true, then the candidate term is added to the collection of context specific terms at step 110. The collection of context specific terms that is generated at step 110 comprises terms that are considered to be used by an organization, a sub-group or user within the organization, or a component of an educational system such as an educational department, an instructor, a course, a researcher, a student, and the like. This collection of context specific terms can also be referred to as an "exception list" that contains terms that are not in a standard language list (e.g. the English dictionary). The collection of context specific terms and the list of standard terms (e.g. expected terms) can be kept separate and then combined in the future for various functions such as performing a spell check, generating a glossary, etc.

If the decision at step 108 is false, then the candidate term is not added to the collection of context specific terms at step 112. In either case, the method 100 proceeds to step 114 where it is determined whether there are other candidate terms that need to be checked to see if they should be added to the collection of context-specific terms. If so, then the method 100 proceeds to step 108. Otherwise, the method 100 ends at step 116.

Figure 3:
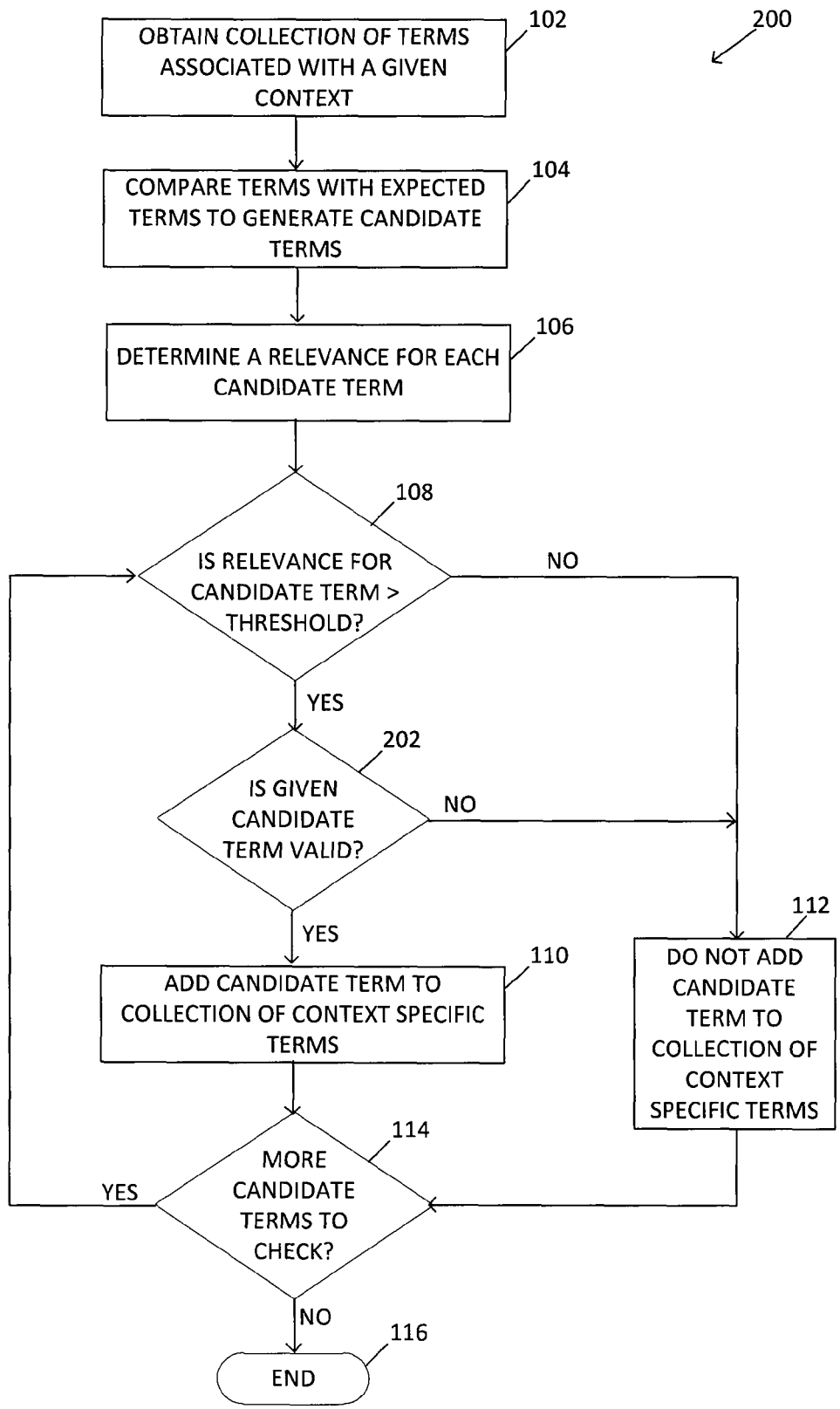
FIG. 3 is a flow chart diagram illustrating an example alternative embodiment of a method for generating context specific terms.

Referring now to FIG. 3, shown therein is a flow chart diagram illustrating an example alternative embodiment of a method 200 for generating context specific terms. The method 200 is similar to the method 100 except for the addition of step 202 after step 108. At step 202, a given candidate term is also checked to make sure that it is a valid term even if the relevance of the given candidate term is above the threshold value. This is done to make sure that there are no errors in generating the context specific terms. The check can be done by an administrator of the system 10 to make sure that the term is not a random incorrect term. Rather than check one term at a time, in an alternative, a list of all of the candidate terms that have a relevance greater than the threshold can be presented to the administrator, who would then review the list and choose which terms to add to an organization's language. This can also be done at the sub-organizational level as well to determine which groups within the organization would have access to those terms. For example, the instructor of a course could examine the list of terms that are non-English terms for a particular course and add new terms just for that course.

It should be noted that there can also be embodiments in which the steps of determining a relevance for the candidate terms and comparing the relevance to a threshold are optional. In this case, an administrator would review the candidate terms and determine which of these terms are context specific terms.

In alternative embodiments, an authorized user (e.g. student or instructor) or administrator may be able to manually add a context specific term. For example, a student can add a context specific term to their own personal definitions/database that is potentially tied to their ePortfolio. As another example, an instructor can add a context specific term to a database corresponding to terms in all of the classes that the instructor teaches, a subset of the classes that the instructor teaches, or the terms that are used in the instructor's department. Another example would be an educational community administrator that adds a context specific term to the entire community database, such as, but not limited to, an IT administers adding a term to a corporate environment, for example. In some cases, the authorized user can also define or manage the scope of a database to which a context specific term is added. For example, the authorized user can choose to add a context specific term only to a course database rather than a department wide database, etc. In this case, a user's role in the community may affect the scope of the databases to which the user can add context specific terms.

Figure 4:
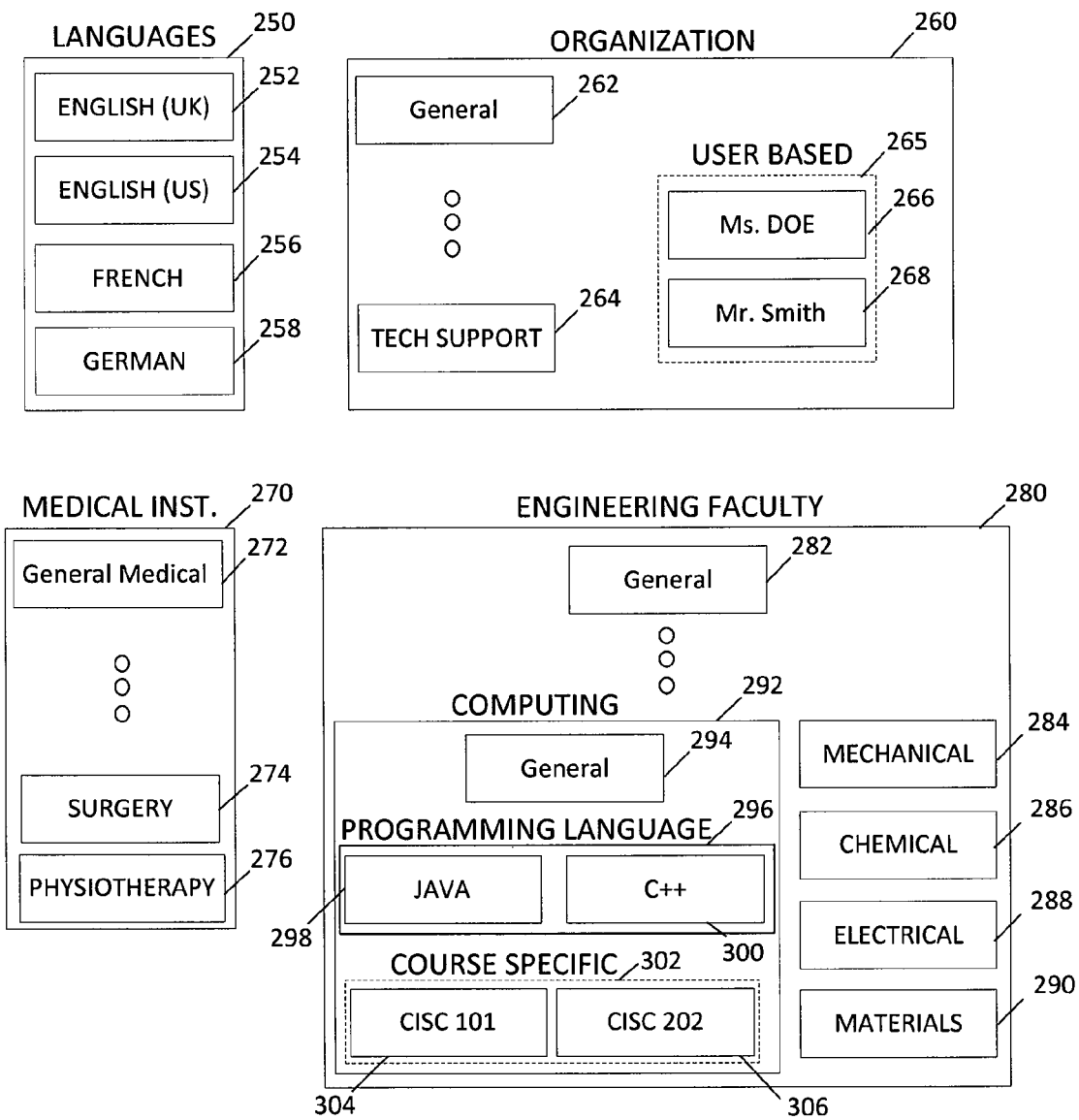
FIG. 4 is a block diagram illustrating an example embodiment of several collections of expected terms and context specific terms for a variety of contexts.

Referring now to FIG. 4, shown therein is a block diagram illustrating an example embodiment of several collections of expected terms and context specific terms for a variety of contexts. The collection of expected terms can be various language dictionaries 250 such as the English (UK) dictionary 252, the English (US) dictionary 254, the French dictionary 256 and the German dictionary 258. The collection of expected terms can also include a general medical dictionary 272 and a general engineering dictionary 282. At least one of these dictionaries may alternatively be an encyclopedia.

The repositories in FIG. 4 also include collections of context specific terms that can be generated by methods 100 or 200. FIG. 4 shows that a collection of context specific terms can be associated with, but not limited to, an educational course, an educational institution, a corporation, and a medical institution. Context specific terms can also be associated with any organizational groups within the entities previously listed or with a user identifier for an individual who is affiliated with any of these entities. For example, for an organization 260, there can be a generic collection 262 of context specific terms that includes terms that generally apply to the entire organization 260. There can also be context specific terms that are specifically used within a group. For example, the tech support group can have a tech support collection of context specific terms 264. In addition, there can be user based collections of context specific terms 265 for terms that are specific to particular users such as collection 266 for Ms. Doe and collection 268 for Mr. Smith. These collections of user based context specific terms can also be defined for other organizations such as, but not limited to, employees in various medical departments of a hospital, as well as for professors/instructors and students of various educational courses.

In addition, there can be other collections of context specific terms including a surgical and physiotherapy collection of context specific terms 274 and 276 for special terms used in the surgical and physiotherapy departments of a medical institution 270 that are not generally present in a collection of expected terms like the English dictionary. Other examples include collections of context specific terms 284 to 290 for the mechanical, chemical, electrical, materials and computing departments of an engineering faculty 280 at a university or college. Within a particular department, such as for the computing department 292, there can be collections of context specific terms for programming languages 296 such as Java 298 and C++ 300 as well as specific courses collections 304 and 306 for courses CISC 101 and CISC 202.

It should also be noted that these various collections of context specific terms can be layered or hierarchical. A box located within another box in FIG. 4 shows an example hierarchical relationship. For example, the user based collections of context specific terms 265 are within the collection of context specific terms for the organization 260. As another example, course based collections of context specific terms 302 are within a department based collection of terms 292 which is within a faculty based collection of context specific terms 280.

The layering or hierarchy of context specific terms can be used to allow a particular user to access or otherwise use a collection of context specific terms. For example, a computer engineering student will have access to the general collection of context specific terms 294 and may also have access to the collections of context specific terms 304 and 306 if the student is taking the courses CISC 101 and CISC 102. Likewise, an employee within the organization 260, such as Mr. Smith, can have access to their user based collection of context specific terms as well as those collections of context specific terms for those departments that the employee is affiliated with. It is also useful to have different context specific terms 266 and 268 related to different users as some users may frequently use non-standard terms that are not used by other users.

There are also various functions that can be performed using the collection of context-specific terms depending on the attributes of users who are using the functions. The attributes of the user will specify which collections of context specific terms they will most likely be using. For example, if the user is a computer engineering student in North America, they will likely need access to the English (US) dictionary 254, the general computing dictionary 294 as well as maybe the collection of context specific terms 296 and 298 for the C++ and Java programming languages. Example of various functions that can use the collections of context specific terms include, but are not limited to, a spell-check function, a glossary function and various searching functions. In some embodiments, the system 10 can recommend resources based on context specific terms. For example, context specific terms may be related to the iPod but don't match with standard dictionary terms, in which case the system 10 can search for resources in an organization or for web-based resources that use similar context-specific terms and recommend and/or provide easy access to the located information/files. This is useful as recommendations based on standard words can be irrelevant (e.g. resources are located based on the words "the", "want" or "believe") but context-specific terms (e.g. "femur", "necrotizing fasciitis", etc) would likely provide be more interesting sources.

Figure 5:
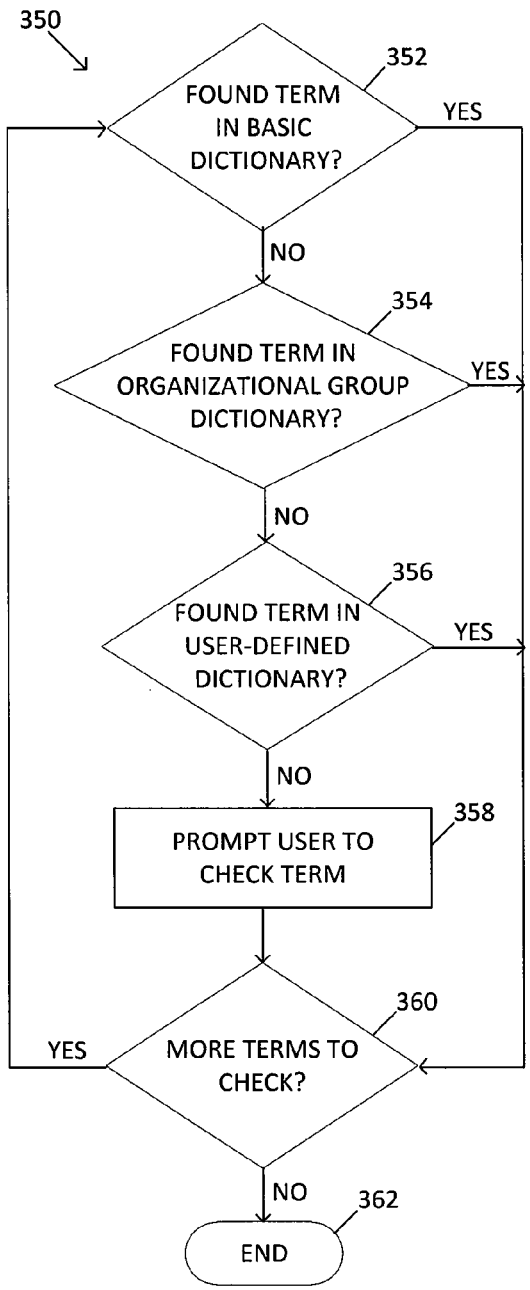
FIG. 5 is a flow chart diagram illustrating an example embodiment of a spell-check method using collections of expected terms and context specific terms.

Referring now to FIG. 5, shown therein is a flow chart diagram illustrating an example embodiment of a method 350 for a spell-check application that can use collections of expected terms (e.g. standard dictionaries) and context specific terms based on a user's affiliation with various groups in an organization or system thereby being affiliated with corresponding collections of context specific terms. The method 350 can use the standard terms and one or more collections of context specific terms in a layered fashion thereby creating a cascade of valid terms within a given hierarchy, as is shown in FIG. 5, or can combine all of these terms into a single set of terms that is used with the spell-check function. For example, a search index can be dynamically generated based on the user and the user's location within an organization or affiliation with an educational institution including the courses that the user is taking.

At step 352, the method 350 checks if a current term is spelled properly by looking in a standard or basic dictionary. If the current term is found in the standard dictionary then the method 350 proceeds to step 360. If the current term is not found in the standard dictionary, then the method 350 proceeds to step 354 where it determines if the current term is in an organizational group dictionary that is generated based on a collection of context specific terms for an organizational group that the user of the spell-check method is affiliated with. If the current term is located then the method 350 proceeds to step 360. Otherwise, the method 350 proceeds to step 356 where it determines if the current term is in a user-defined dictionary which is generated based on a collection of context specific terms that is affiliated with the user of the method 350. If so, the method 350 proceeds to step 360. Otherwise, the method 350 proceeds to step 358 where it prompts the user to check the current term to determine whether it is a valid term. At step 360, the method 350 then determines if there are other terms to check. If so, the method 350 goes to step 352. Otherwise the method 350 ends at step 362.

Figure 6:
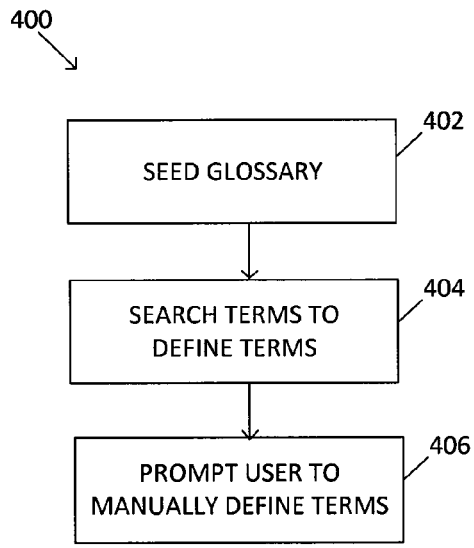
FIG. 6 is a flow chart diagram illustrating an example embodiment of a method for generating a glossary based on context specific terms.

Referring now to FIG. 6, shown therein is a flow chart diagram illustrating an example embodiment of a method 400 for generating a glossary based on context specific terms. At step 402, the glossary is associated with a particular organization, or a group within an organization, or a unit within an educational system or a user or some other entity. Basically, the glossary can be associated with any level within the hierarchy of the organization or educational system as the case may be. The glossary is then seeded based upon one or more context specific terms for a given context, for example, the collection(s) of context specific terms that correspond to the level within the hierarchy of the organization or educational system (this may include all sub-levels within the hierarchy in some cases). The term seeding means that the glossary is pre-populated with terms but definitions for the terms are not included if they are not immediately available. At step 404, the method 400 conducts searches based on the terms in the glossary in order to find possible definitions for those terms. This can include searching public documents that are accessible on the Internet or documents on an Intranet of the organization as well as other locations where definitions will likely be found. In some cases, this can also include using public services such as Google's "define: XXX" search option. If definitions are found, then they are included in the glossary; this can later be checked by an administrator or another user to make sure that the definitions are correct. At step 406, the method 400 then prompts a user, such as an organizational administrator, to provide definitions for any terms in the glossary for which definitions were not found.

Referring now to FIG. 7, shown therein is a flow chart diagram illustrating an example embodiment of a method 450 for determining a subject matter for a context specific term. At step 452, the method 450 selects a given context specific term. At step 454, the method 450 then searches for documents that contain the given context specific term. These documents can be private documents contained within an Intranet or a server within an organization. These documents can also be public documents that are located on public networks such as the Internet. At step 456, the method 450 then defines the subject matter of the given context specific term based on the subject matter of the documents that contain the given context specific term. The subject matter can be determined in a variety of ways. For instance, the subject matter can be based on the technical or cognitive domain in which a located document is found. For example, if the located document is an online version of "Gray's Anatomy of the Human Body", then the subject matter is most likely to be medical. Alternatively, if the term is found in an online engineering dictionary, then the term is most likely to be an engineering term. Alternatively, the subject matter can be determined if the located document is in a domain that has a particular subject matter, such as PubMed which contains medical subject matter. In another alternative, known metadata structures can be used to determine the subject matter (in this case content is searched in a repository that contains a known structured metadata which indicates subject area/matter).

Referring now to FIG. 8, shown therein is a flow chart illustrating an example embodiment of a method 500 for locating public documents based on context specific terms. The method 500 can be used for a back-end search engine that is used to find public documents related to organizational concepts based on one or more context specific terms. At step 502, the method 500 obtains one or more context specific terms. At step 504, the context specific terms are provided to a search engine that searches for one or more electronic files that are related to (e.g. use) the context specific terms. The electronic files can be public documents that are located on the Internet or some other network. At step 506, the located documents are retrieved. The located documents can then be analyzed by a user. For example, the method 500 can further comprise classifying a given context specific term based on an assigned technical level as determined from a search of public files (this can be determined based on known metadata structures for example).

It should be noted that the method of generating a collection of context specific terms and the various functions that can utilize the collection of context specific terms improve the efficiency with which a user can work with and learn the context specific terms. For instance, when the user is using a spell-check function, the function can operate more quickly since it does not have to prompt the user when it encounters context specific terms but rather can automatically refer to a list of context specific terms to see if there is a match. Furthermore, if a user encounters a context specific term that the user does not understand then the user may be able to access a glossary to find a meaning for the context specific term or the user can initiate a search for public documents that use the context specific term. This saves individual users from the time and task inconvenience of having to add organization-specific terms to their own personal dictionaries. The teachings described herein can also be used to review many different organizations or groups to see what types of new terminology is emerging across a particular industry, culture, geography, and the like.

It should be understood that various modifications can be made to the embodiments described and illustrated herein, without departing from the embodiments, the general scope of which is defined in the appended claims.

The invention claimed is:

1. A method for generating context specific terms at a computing device, the computing device comprising at least one processor, the method comprising the at least one processor:
   scanning one or more electronic files stored on one or more repositories associated with an application service, wherein the one or more objects are associated with a given context;
   obtaining, based on the scan of the one or more electronic files, a collection of candidate terms from the one or more electronic files associated with the given context;
   determining a relevance for each of the candidate terms;
   determining whether to add a given candidate term to a collection of context specific terms for the given context if the relevance for the given candidate term is above a threshold; and
   if it is determined that the given candidate term is to be added, adding the given candidate term to the collection of context specific terms for the given context, and storing the collection of context specific terms in a file associated with the application service.

2. The method of claim 1, wherein determining whether to add the given candidate term to the collection of context specific terms comprises ensuring that the given candidate term is a valid term.

3. The method of claim 1, wherein determining the relevance comprises ranking the candidate terms.

4. The method of claim 1, wherein determining the relevance comprises obtaining a weighted frequency for the candidate terms.

5. The method of claim 4, wherein the candidate terms that are more common are more heavily weighted than the candidate terms that are less common.

6. The method of claim 1, wherein the method further comprises determining a source of the at least one electronic file.

7. The method of claim 6, wherein the determining of the source of the at least one electronic file comprises:
   determining the one or more contexts for which the given candidate term has a relevance above a preset threshold; and
   associating the one or more electronic files with the source corresponding to the one or more contexts for which the given candidate term has a relevance above the preset threshold.

8. The method of claim 6, wherein the source is at least one of an educational course, an organizational group, and a user.

9. The method of claim 1, wherein the method further comprises using the collection of context specific terms in a spell-check application.

10. The method of claim 1, wherein the method further comprises associating the collection of context specific terms with at least one of an educational course, an organizational group and a user identifier.

11. The method of claim 1, wherein the method further comprises seeding a glossary based upon one or more of the context specific terms for the given context.

12. The method of claim 1, wherein the method further comprises providing one or more of the context specific terms to a search engine that searches for one or more electronic files that are related to the one or more context specific terms.

13. The method of claim 1, wherein the one or more electronic files comprise at least one of a webpage, a word processing document, a spreadsheet, a presentation document, a search index of organizational content, database content, discussion forum content, and an email.

14. The method of claim 1, wherein the method further comprises classifying a given context specific term based on an assigned technical level as determined from metadata structure associated with a search of public files.

15. The method of claim 1, wherein the method further comprises classifying a given context specific term based on a subject matter of located files that use the context specific term.

16. The method of claim 1, wherein determining whether to add the given candidate term to the collection of context specific terms for the given context comprises comparing the collection of candidate terms to a current collection of content specific terms for the given context.

17. A computing device for generating context specific terms, wherein the computing device comprises:
   one or more data storage devices comprising at least one electronic file, wherein the one or more data storage devices are associated with an application service; and
   at least one processor in data communication with the data storage device, the at least one processor being adapted to scan one or more electronic files stored on the data storage device, wherein the one or more objects are associated with a given context, to obtain, based on the scan of the one or more electronic files, a collection of candidate terms from the one or more electronic files associated with the given context; to determine a relevance for each of the candidate terms; to determine whether to add a given candidate term to a collection of context specific terms for the given context if the frequency of occurrence for the given candidate term is above a threshold; and if it is determined that the given candidate term is to be added, to add the given candidate term to the collection of context specific terms for the given context, and store the collection of context specific terms in a file associated with the application service.

18. The computing device of claim 17, wherein the at least one processor is further adapted to determine the relevance by ranking the candidate terms.

19. The computing device of claim 17, wherein the at least one processor is further adapted to determine the relevance by obtaining a weighted frequency for the candidate terms.

20. The computing device of claim 17, wherein the at least one processor is further adapted to determine a source of the at least one electronic file.

21. The computing device of claim 20, wherein the at least one processor is further adapted to determine the one or more contexts for which the given candidate term has a relevance above a preset threshold, and to associate the one or more electronic files with the source corresponding to the one or more contexts for which the given candidate term has a relevance above the preset threshold.

22. The computing device of claim 21, wherein the source is at least one of an educational course, an organizational group, and a user.

23. The computing device of claim 17, wherein the at least one processor is further adapted to use the collection of context specific terms in a spell-check application.

24. The computing device of claim 17, wherein the at least one processor is further adapted to seed a glossary based upon one or more of the context specific terms for the given context.

25. The computing device of claim 17, wherein the at least one processor is further adapted to classify a given context specific term based on a subject matter of located files that use the context specific term.

26. A non-transitory computer-readable storage medium storing instructions that, when executed, cause at least one processor to perform the method of claim 1.

* * * * *